United States Patent [19]

MacLeod et al.

[11] Patent Number: 4,841,393
[45] Date of Patent: Jun. 20, 1989

[54] SPINDLE MOTOR FOR A DISC DRIVE

[75] Inventors: Donald J. MacLeod, Santa Cruz County; Miles L. Peterson, Santa Clara County; Charles G. Nowark, Jr., Santa Cruz County, all of Calif.

[73] Assignee: Seagate Technology, Inc., Scotts Valley, Calif.

[21] Appl. No.: 116,044

[22] Filed: Nov. 2, 1987

[51] Int. Cl.$^4$ .............................................. G11B 15/00
[52] U.S. Cl. ................ 360/98.07; 360/99.04; 318/254; 310/68 R
[58] Field of Search ................... 360/97–99; 310/68 R, 268; 318/254, 138, 439

[56] References Cited

U.S. PATENT DOCUMENTS

| | | | |
|---|---|---|---|
| 4,568,847 | 2/1986 | Schmider | 310/268 |
| 4,568,862 | 2/1986 | Tassinario | 318/254 |
| 4,633,149 | 12/1986 | Welterlin | 318/138 X |

*Primary Examiner*—John H. Wolff
*Attorney, Agent, or Firm*—Flehr, Hohbach, Test, Albritton & Herbert

[57] ABSTRACT

A spindle motor for use in a disc drive including a base casting for the drive, the motor comprising a shaft extending through the base casting and carrying a hub supporting one or more discs for rotation, the shaft being supported for rotation in the casting by one or more bearings, rotation of the shaft being controlled by an axial air gap motor comprising a flat rotor connected to the shaft and extending axially parallel to the base casting of the housing, the rotor comprising a magnet supported by a rotor support plate carried on an end of the shaft, a single printed board is supported so as to have first and second surfaces essentially out of contact with the base casting and the rotor support plate for supporting on one surface thereof a plurality of axially oriented coils in a toroidal path around the shaft and in a plane parallel to the magnet, and on the other of the surfaces a toroidal magnetic return path element mounted on the opposite side of the axially oriented coils from the rotor, the magnetic return path being formed of a wound coil of thinly sliced sheet steel, thereby forming a magnetic path comprising the magnet, the coils and the return path element, whereby a low profile spindle motor is achieved.

11 Claims, 4 Drawing Sheets

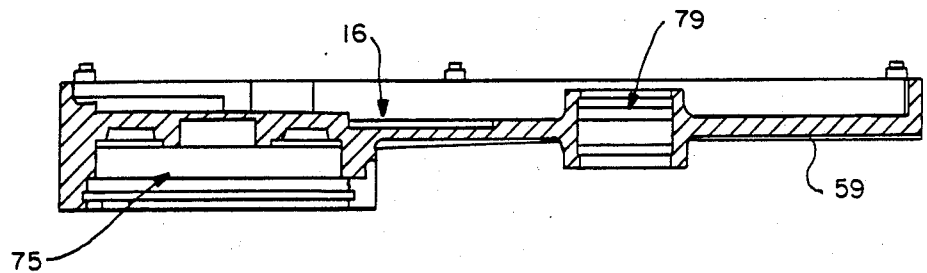
FIG.—5A
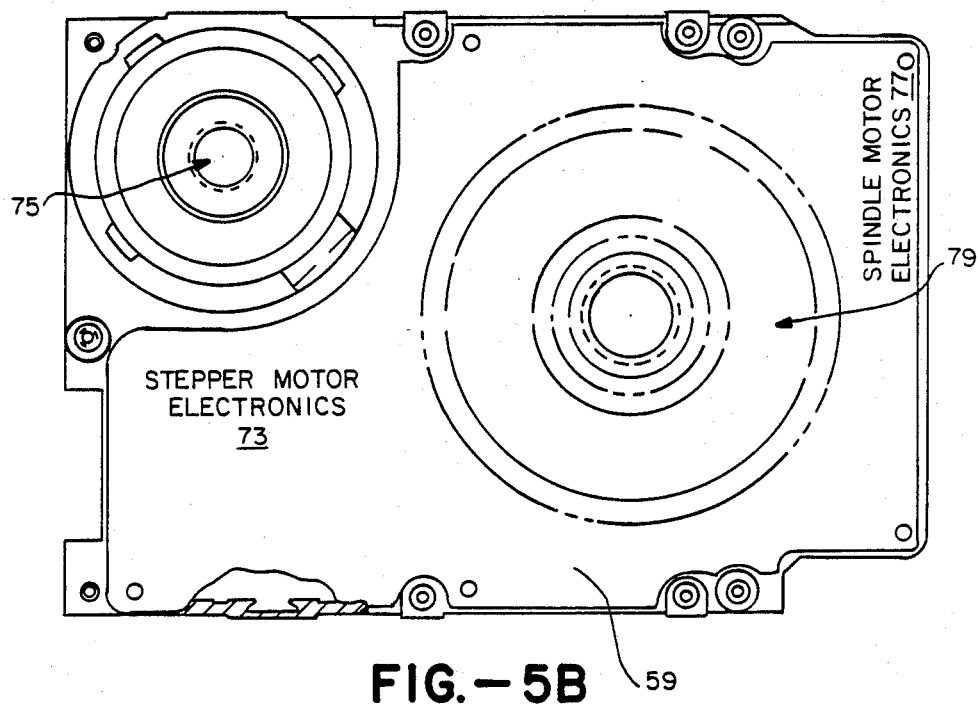
FIG.—5B

SPINDLE MOTOR FOR A DISC DRIVE

FIELD OF THE INVENTION

This invention is directed generally to the field of disc drives and more particularly to an improved spindle motor construction for a disc drive.

CROSS-REFERENCE TO RELATED APPLICATION

This invention is especially useful in a spindle motor used in a rotary actuator of the type disclosed in U.S. application Ser. No. 914,690, filed Oct. 2, 1986. Said application is incorporated herein by reference.

DESCRIPTION OF THE PRIOR ART

Disc drives machines record and reproduce information stored on concentric circular tracks on magnetic discs. These recording discs are driven at a constant rotational speed by a spindle motor, while a transducer is selectively positioned over locations on the disc where the information to be accessed is stored, in order to be able to rapidly and accurately access the information stored on the disc. Therefore it is important to provide a spindle motor capable of quickly bringing the discs up to their constant rotational speed, and which is also capable of maintaining that constant rotational speed for a significant period of time.

The difficulty of properly designing such a motor is compounded by the constant reduction in size of disc drives. Disc drives have an increasingly low profile, thereby necessitating the use of many innovative design techniques in achieving an efficient, low profile dc spindle motor. One answer to the problem of the need for such a motor has been the use of what is commonly termed a pancake motor. The common structural features of a pancake motor include a plurality of flat, axial coils of the air core type affixed to a printed circuit board to define the motor stator. The coils are regularly axially spaced about a motor shaft which extends through the printed circuit board. One end of the shaft is mounted on bearings to extend up through the disc drive base casting, the top of the shaft carrying a hub which supports one or more discs for constant rotation. The other end of the shaft supports a shallow, cup-shaped element containing an annular permanent magnet comprising the motor rotor. The rotor and stator operate in combination to provide a brushless dc motor particularly suited for a disc drive.

When the coils are energized in order, currents flowing therethrough interlink with magnetic flux from the permanent magnet so as to generate torque for rotating the motor shaft. In some such motors, it is known to provide a stationary magnetic return path annular on the opposite side of the coils from the flat, rotating magnet.

The use of such a stationary magnetic return path is already known in this technology. However, such stationary magnets are usually stamped from a sheet of magnetic steel. Because of the direction of magnetic flux in the steel runs perpendicular to the direction of lamination, high current losses are induced and represent a significant. loss of power. Such eddy currents occur in steel plate when the magnetic field is changed as a function of time. In cases of a motor such as the type described herein, when the field is reversed, which happens at a relatively high frequency, eddy currents are induced in the direction that produces a magnetic field to oppose the change. Thus, significant eddy current losses can occur.

Prior efforts to reduce eddy current losses have attempted to use a return path constructed out of powdered metal such as steel of 3% silicon. Some reduction in losses will occur; however, the powdered metal is difficult to manufacture in thin sheets, and material that has good high frequency performance tends to be brittle in such thin sheets.

SUMMARY OF THE INVENTION

It is an objective of this invention to provide an improved spindle motor for use in a disc drive. More particularly, it is an objective herein to provide a spindle motor incorporating a magnetic return path having reduced eddy current losses.

A related objective of this invention is to provide a spindle motor that is easier to assemble than known spindle motors for use in disc drives.

It is a further objective to provide a disc drive design which lends itself to rapid, accurate assembly.

These and other objectives are achieved by providing a pancake type spindle motor using a single printed circuit board to support a plurality of flat air core coils axially arrayed about a motor shaft, the printed circuit board supporting the coils facing a shallow cup-shaped element supporting an annular permanent magnet. The opposite side of the printed circuit board supports a magnetic return path which is annular in form. The magnetic return path is constructed of a spiral wound coil of thinly sliced sheet steel. This tape wound magnetic return path allows the magnetic flux to flow easily in a circumferential direction, while preventing eddy currents from flowing in a radial direction, thereby significantly reducing eddy current losses. In a preferred form, the steel would be 0.004" thick and 0.060" wide, and is formed by winding on a core to a suitable size. Such a tape wound coil is mechanically sound, and inexpensive to manufacture. By providing the coil on one side of a printed circuit board opposite to the side of the printed circuit board that supports the flat stator coils, and by further designing the printed circuit board to include all necessary electronic components for commutation of the axial coils and rotor position sensing, a highly efficient spindle motor, inexpensive to manufacture and assemble, is achieved.

BRIEF DESCRIPTION OF THE DRAWINGS

The features and advantages of this invention will be better understood with reference to the following drawings, wherein:

FIGS. 5A and 5B are a vertical sectional view and plan view, respectively, of the base casting as it supports the molded circuit board of the invention.

DESCRIPTION OF A PREFERRED EMBODIMENT

Figure 1:
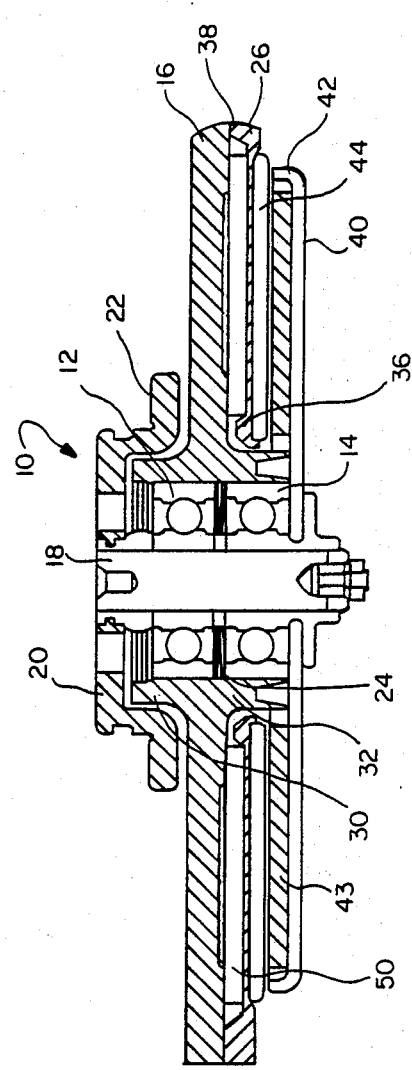
FIG. 1 is vertical sectional view of a spindle motor invention.

In order to facilitate understanding of this invention and the problems solved thereby, reference will first be made to FIG. 1 in which a flat, brushless dc motor 10 of a type incorporated this invention is illustrated in vertical section. The low profile spindle motor 10 uses bearings 12, 14 incorporated directly into the disc drive base casting 16 to support the shaft 18 for rotation. A hub 20 supported on the top of the shaft 18 carries one or more discs 22 for rotation. Appropriate preload of the bearings 12, 14 is achieved and maintained with a spring 24 located between the bearings and arranged to produce a preload configuration known as DB in the art, which provides the greatest possible stability for the bearing system within the casting 16.

The motor electronics are provided mounted on a single printed circuit board 26 supported from the casting 16. Specifically, the casting 16 has shoulders 30 and 32 which define a central bore in which the bearings 12, 14 which support the shaft 18 are located. Located on the outer surface of the lower shoulder 32 is an opening that may be used to connect inner end 36 of the printed circuit board 26 to the casting 16. The outer end 38 of the printed circuit board is similarly supported from the casting 16.

The end of the shaft 18 distal from the hub 20 supports a shallow cup-shaped element 4 having an upturned end 42 which element together with magnet 43 forms the motor rotor 41. The cup-shaped element 40 supports the annular permanent magnet 43 which is adhered to its inner surface. In a preferred embodiment, the annular magnet 43 is configured to have eight pie-shaped sectors of alternating magnetic polarities, facing the six flat axial air core coils 44A-F, which are affixed to the printed circuit board as shown in FIG. 2A. It can be seen from an inspection of FIG. 1 that the coils 44A-F are aligned with and overlie the annular magnet 43 so that with selective sequential energization of the coils 44, a magnetic path is completed between a section of the magnet of one polarity, one of the coils, and returning to an oppositely polarized section of the magnet 42. Thus, by sequentially energizing the coils 44A-F, rotation of the magnet 43 and thus, the shaft 18, is achieved.

Figure 4C:
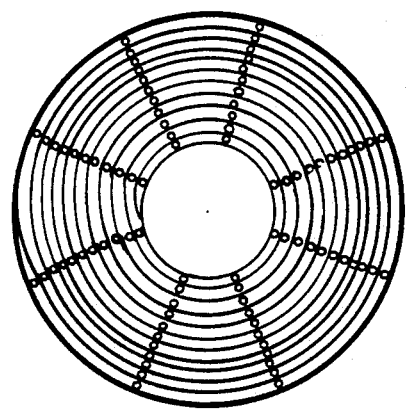
FIGS. 4A, 4B and 4C illustrate the improvement gained by this invention in reduction of eddy currents.

It is well known in this technology to provide a magnetic return path 50 to efficiently complete the magnetic circuit. However, as discussed above, such magnetic return paths have typically been formed of sheet steel or powdered metal, and thus have been subjected to significant eddy current losses. As more specifically shown in FIG 4A, the eddy currents illustrated by the arrows 52 in FIG 4A can be significant in solid steel return paths because there is nothing to block the current flow.

Figure 4B:
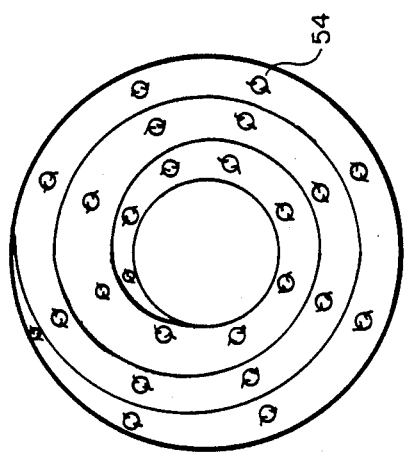
Figure 4A:
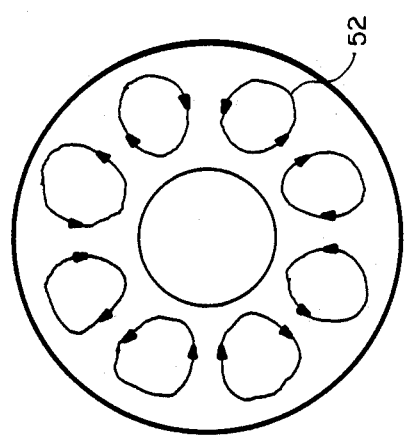

FIG. 4B illustrates one form of this invention, in that the return path is formed of coarsely wound, i.e., relatively thick, steel spiral. Here, as illustrated by the arrows 54B, the eddy currents are significantly reduced, as there is only a limited place for current to flow.

FIG. 4C illustrates a more finely wound return path element, resulting in even more limited eddy currents as indicated by arrows 54C''.

Figure 3:
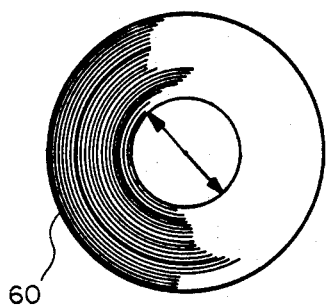
FIG. 3 illustrates the steel core coil that forms the magnetic return path of this invention.

In the preferred form of this invention illustrated in FIG. 3, the return path is formed of wound steel tape 60 on the order of 0.004" thick and 0.060" wide. Because of the very limited path for current to flow, the eddy currents are very small (see FIG. 4C). Therefore, with this breaking up of the eddy current paths, the eddy currents are significantly diminished, maximizing the efficiency and power of the motor design.

Figure 2B:
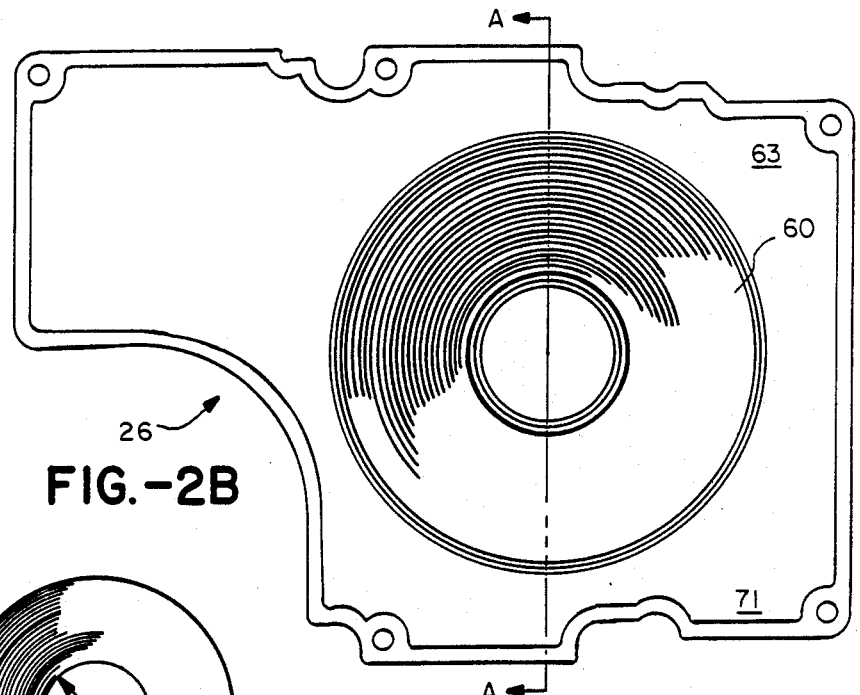
FIG. 2 the single printed circuit board used to support both the coils and the magnetic return path of the disc drive.

A further efficiency of the present design is illustrated and apparent from FIGS. 2A and 2B. As shown in these figures, all the discrete and LSI type electronic components such as the drive speed control electronics for both the stepper motor 70 and spindle motor 10 (shown more clearing in FIG. 5B) mounted on a single molded printed circuit board 26. FIG 2A shows the front ("primary") side 59 of this printed circuit board 26 mounting in annular array the six air core axial coils 44A-F whose selective energization drives the rotor of the motor. Posts 61 are provided molded into the board surface 69 to maintain the shape of 30 each coil 44 and its accurate alignment in the annular array.

The necessary Hall effect devices 64A-C to control selective energization of the coils of the motor are arrayed on the same printed circuit board surface 59, together with all the other electronic components necessary for control of the stepper motor at electronics section 73 adjacent to the stepper motor region 75 and spindle motor electronics 77 adjacent to the region 79 for mounting the spindle motor. In this way, assembly of the motor is facilitated, and its overall structural integrity is maximized. The precise location of the Hall devices 64A-C relative to the assembled spindle motor is also achieved.

Figure 2A:
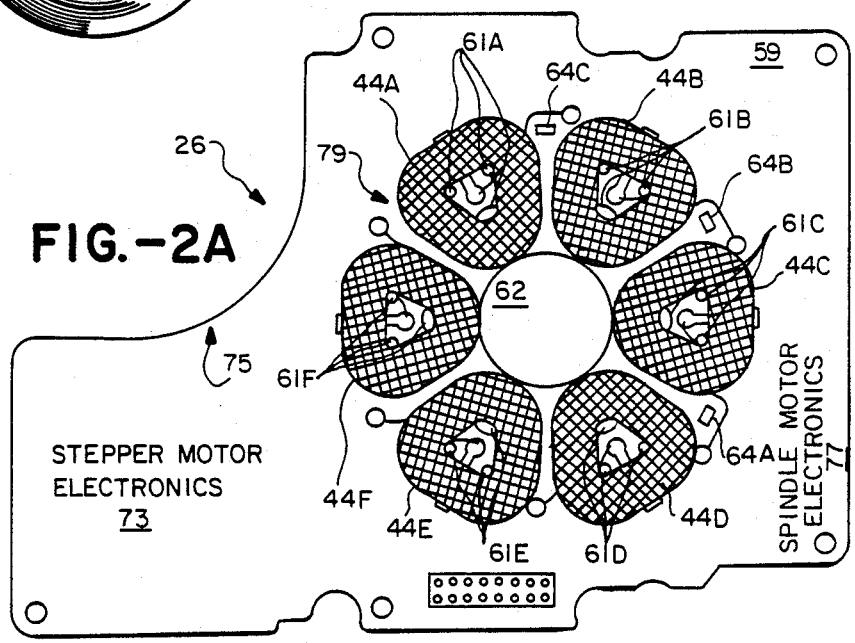

The other side 63 of the molded board (shown in FIG. 2B) supports the coil 60 directly beneath the casting 16 shown in FIG. 1. The casting 16 itself is shown in a vertical sectional view in FIG. 5A, and in plan view in FIG. 5B. This view illustrates the relative positions of the location 79 for the spindle motor and the location 75 for the stepper motor. The molded printed circuit board as shown in FIG. 5B underlies the entire region allocated to the spindle motor, and lies adjacent to the region allocated to the stepper motor. The use of this board to support the coil 60, cores 44 and electronics 73, 77 provides for quick assembly, precise alignment of all elements of the spindle motor and effective use of space in this disc drive.

Other features and advantages of this invention may become apparent to a person of skill in the art who studies this disclosure. Therefore, the scope of this invention is to be limited only by the following claims.

What is claimed is:

1. A spindle motor for use in a disc drive including a base casting for the drive, the motor comprising a shaft extending through said base casting and carrying a hub supporting one or more discs for rotation, said shaft being supported for rotation in said casting by one or more bearings, rotation of the shaft being controlled by an axial air gap motor comprising a flat rotor connected to the shaft and extending axially parallel to the base casting of the housing, said rotor comprising a magnet supported by a rotor support plate carried on an end of said shaft, means comprising a single printed board supported to have first and second surfaces essentially out of contact with said base casting and said rotor support plate for supporting on one surface thereof a plurality of axially oriented coils in a toroidal path around said shaft and in a plane parallel to said magnet, and on the other of said surfaces a toroidal magnetic return path element mounted on the opposite side of said axially oriented coils from said rotor, said magnetic return path being formed of a wound coil of thinly sliced sheet steel, thereby forming a magnetic path comprising said magnet, said coils and said return path element, whereby a low profile spindle motor is achieved.

2. A spindle motor as in claim 1 wherein the magnetic return path is formed of steel about 0.004" thick.

3. A spindle motor as in claim 2 wherein the magnetic return path is formed of steel about 0.060" wide.

4. A spindle motor as in claim 1, wherein control electronics for controlling rotation of said shaft are mounted adjacent to said coil on said printed circuit board.

5. A spindle motor as in claim 1 wherein shaft extends through a bore in said casting, said bore defining shoulders on the side of said casting opposite said disc for mounting and supporting said printed circuit board.

6. A spindle motor as in claim 5 wherein the periphery of said printed circuit board is supported from said casting.

7. A spindle motor as in claim 1 including a plurality of posts molded in the surface of said printed circuit board in annular array, said coils being mounted adjacent to said posts to maintain the shape of the coils and their alignment in the annular array.

8. An integral base casting for use in a disc drive comprising means for supporting a spindle motor and a stepper motor relative to a constantly rotating disc to be supported on a hub of said spindle motor, the spindle motor comprising said shaft extending through said base casting and carrying a hub supporting one or more discs for rotation, said shaft being supported for rotation in said casting by one or more bearings, rotation of the shaft being controlled by an axial air gap motor comprising a flat rotor connected to the shaft and extending axially parallel to the base plate of the housing, said rotor comprising a magnet supported by a support plate carried on an end of said shaft, means comprising a single printed board supported to have first and second surfaces essentially out of contact with said base casting and said rotor support for supporting on one surface thereof a plurality of axially oriented coils in a toroidal path around said shaft and in a plane parallel to said magnet, and on the other of said surfaces a toroidal magnetic return path mounted on the opposite side of said axially oriented coils from said rotor, said magnetic return path being formed of a wound coil of thinly sliced sheet steel, whereby eddy current paths in the coil are broken up because of the lack of paths for current to follow whereby a low profile spindle motor is achieved.

9. A disc drive as in claim 8 wherein said single printed circuit board extends to be adjacent to the region allocated to said stepper motor, the control electronics for said spindle motor being mounted adjacent said spindle motor on said printed circuit, the control electronics for said stepper motor being mounted adjacent to said stepper motor on said printed circuit board.

10. A spindle motor as in claim 8 wherein the periphery of said printed circuit board is supported from said casting.

11. A spindle motor as in claim 10 including a plurality of posts molded in the surface of said printed circuit board in annular array, said coils being mounted adjacent to said posts to maintain the shape of the coils and their alignment in the annular array.

* * * * *